(12) United States Patent
Allen

(10) Patent No.: US 9,643,637 B1
(45) Date of Patent: May 9, 2017

(54) CARGO BAG FOR AN INSULATED COOLER

(71) Applicant: Penny Allen, Glendale, AZ (US)

(72) Inventor: Penny Allen, Glendale, AZ (US)

( * ) Notice: Subject to any disclaimer, the term of this patent is extended or adjusted under 35 U.S.C. 154(b) by 0 days.

(21) Appl. No.: 14/988,863

(22) Filed: Jan. 6, 2016

(51) Int. Cl.
*B62B 5/00* (2006.01)
(52) U.S. Cl.
CPC ..................................... *B62B 5/00* (2013.01)
(58) Field of Classification Search
CPC ......... A45C 3/001; A45C 11/20; A45C 13/02; B62B 5/00
USPC ........ 224/572, 414, 484, 400; 190/122, 121, 190/124
See application file for complete search history.

(56) References Cited

U.S. PATENT DOCUMENTS

| 5,407,218 | A | 4/1995 | Jackson |
| D370,123 | S | 5/1996 | Klinger |
| 5,782,360 | A * | 7/1998 | Markson ............... B65D 19/385 |
| | | | 150/154 |
| 6,306,029 | B1 | 10/2001 | Long |
| 6,902,087 | B2 * | 6/2005 | Hancock .................... B62J 9/00 |
| | | | 190/902 |
| 7,360,980 | B2 | 4/2008 | Brewer |
| 8,857,654 | B2 | 10/2014 | Mogil |
| 2006/0243768 | A1 * | 11/2006 | Dowell ................... B60R 11/00 |
| | | | 224/400 |
| 2012/0125966 | A1 * | 5/2012 | Greenspon ............. A45C 3/001 |
| | | | 224/572 |

FOREIGN PATENT DOCUMENTS

CA          2351883         5/2002

* cited by examiner

*Primary Examiner* — King M Chu
(74) *Attorney, Agent, or Firm* — Kyle A. Fletcher, Esq.

(57) ABSTRACT

This shortcoming of wheeled insulated coolers is addressed in this disclosure. The cargo bag for an insulated cooler is a harness and a pack that is adapted for use with a wheeled insulated cooler. The cargo bag for an insulated cooler is attached to the wheeled insulated cooler using the harness such that the pack is attached to the wheeled insulated cooler and can be carried on the wheeled insulated cooler while the wheeled insulated cooler is transported to an event location. The cargo bag for an insulated cooler comprises a container and a plurality of straps.

11 Claims, 5 Drawing Sheets

CARGO BAG FOR AN INSULATED COOLER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of travelling articles such as sacks or packs carried on the body, more specifically, a harness and pack adapted to attach to insulated coolers.

Wheeled insulated coolers are commonly available, easily transported and are excellent at keeping consumable or perishable items at temperatures that are considered safe. From the perspective of an event coordinator, a shortcoming of a wheeled insulated coolers is that their carrying capacity is generally limited to the consumable or perishable items being stored. As a practical matter, the successful event often requires items, such as tablecloths, napkins, plates, cutlery, and other sundries, to supplement the consumable or perishable items stored within the wheeled insulated coolers. While the wheeled insulated coolers are readily transported over significant distances, the limitations of the capacity of the wheeled insulated coolers requires the event coordinator to make repeated trips to transport these other practical items from the delivery vehicle to the event site.

SUMMARY OF INVENTION

This shortcoming of wheeled insulated coolers is addressed in this disclosure. The cargo bag for an insulated cooler is a harness and a pack that is adapted for use with a wheeled insulated cooler. The cargo bag for an insulated cooler is attached to the wheeled insulated cooler using the harness such that the pack is attached to the wheeled insulated cooler and can be carried on the wheeled insulated cooler while the wheeled insulated cooler is transported to an event location.

These together with additional objects, features and advantages of the cargo bag for an insulated cooler will be readily apparent to those of ordinary skill in the art upon reading the following detailed description of the presently preferred, but nonetheless illustrative, embodiments when taken in conjunction with the accompanying drawings.

In this respect, before explaining the current embodiments of the cargo bag for an insulated cooler in detail, it is to be understood that the cargo bag for an insulated cooler is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the cargo bag for an insulated cooler.

It is therefore important that the claims be regarded as including such equivalent construction insofar as they do not depart from the spirit and scope of the cargo bag for an insulated cooler. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
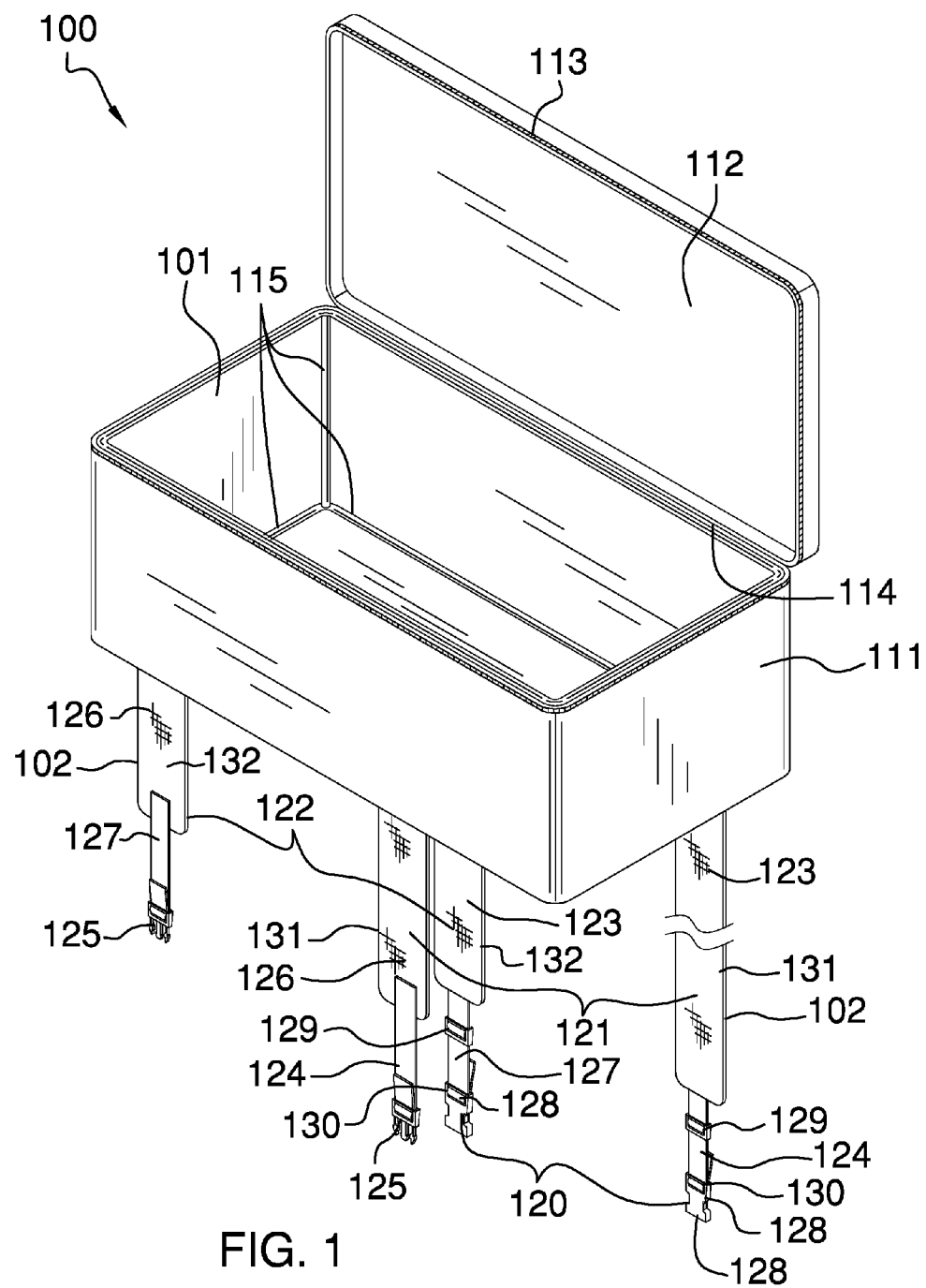
FIG. 1 is a perspective view of an embodiment of the disclosure.
Figure 2:
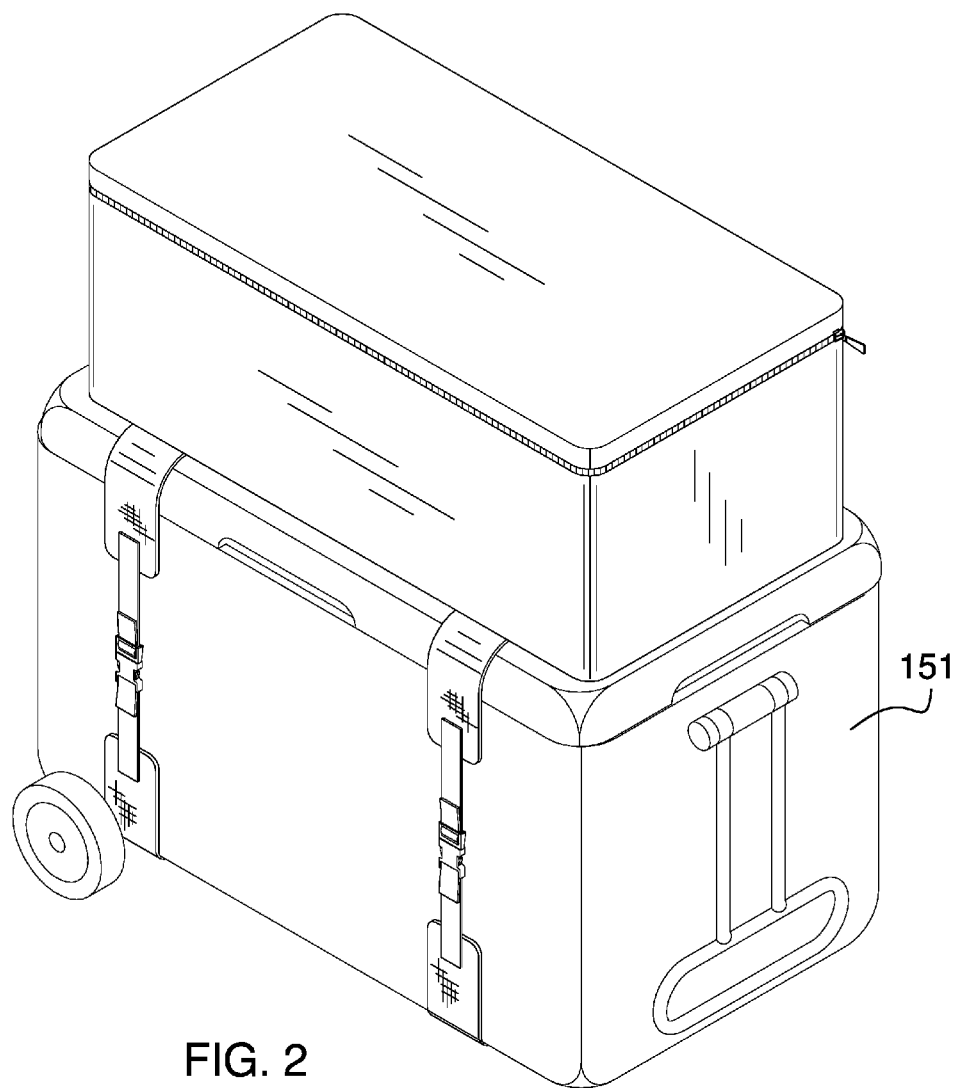
FIG. 2 is an in use view of an embodiment of the disclosure.
Figure 3:
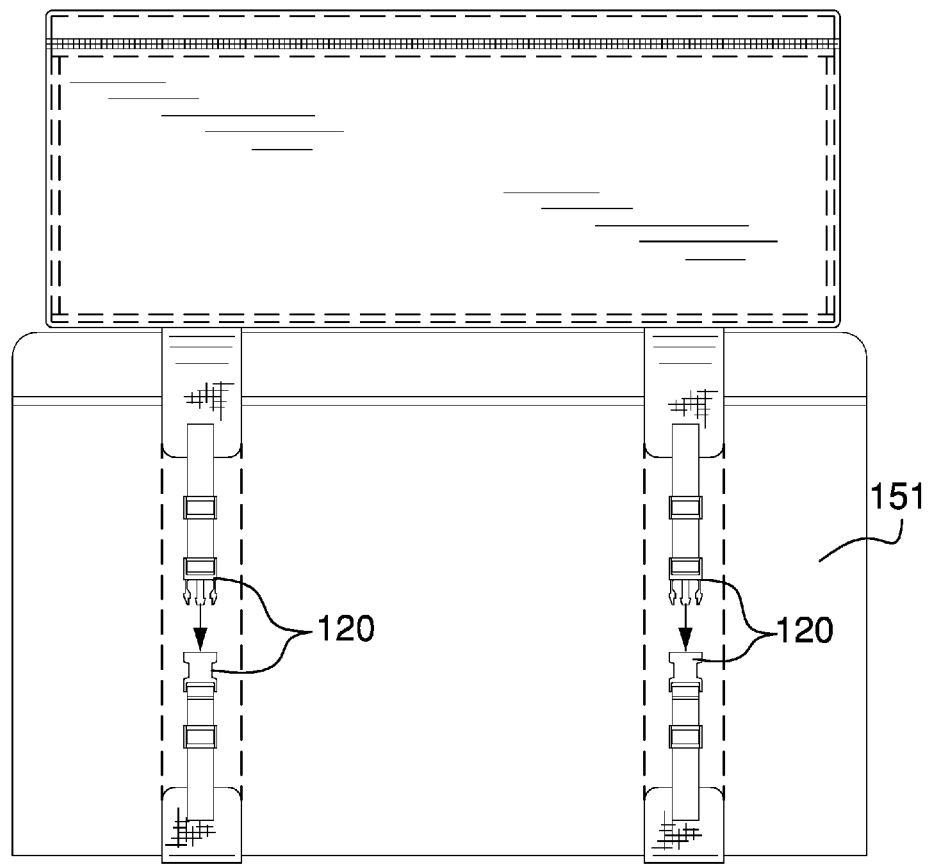
FIG. 3 is a front view of an embodiment of the disclosure.
Figure 4:
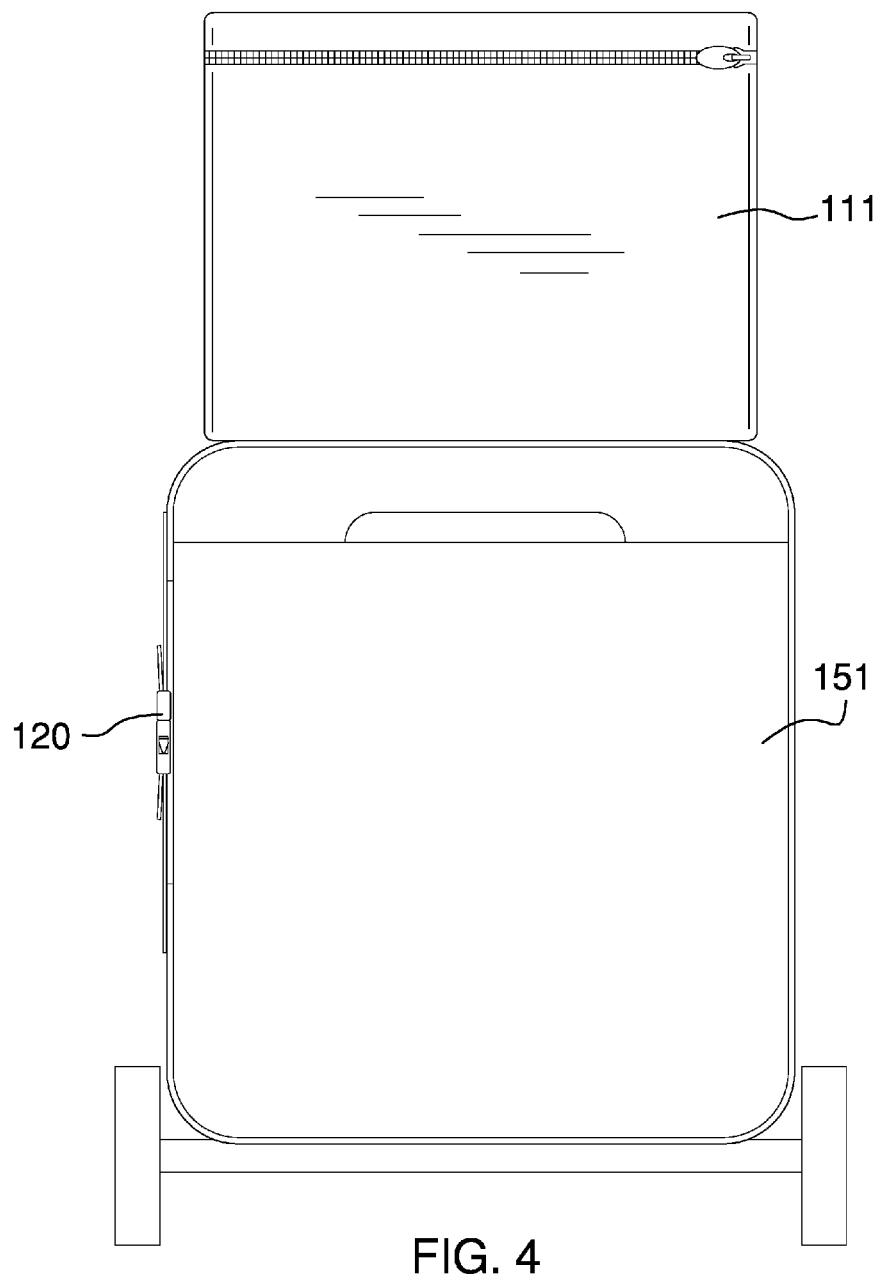
FIG. 4 is an in use view of an embodiment of the disclosure.
Figure 5:
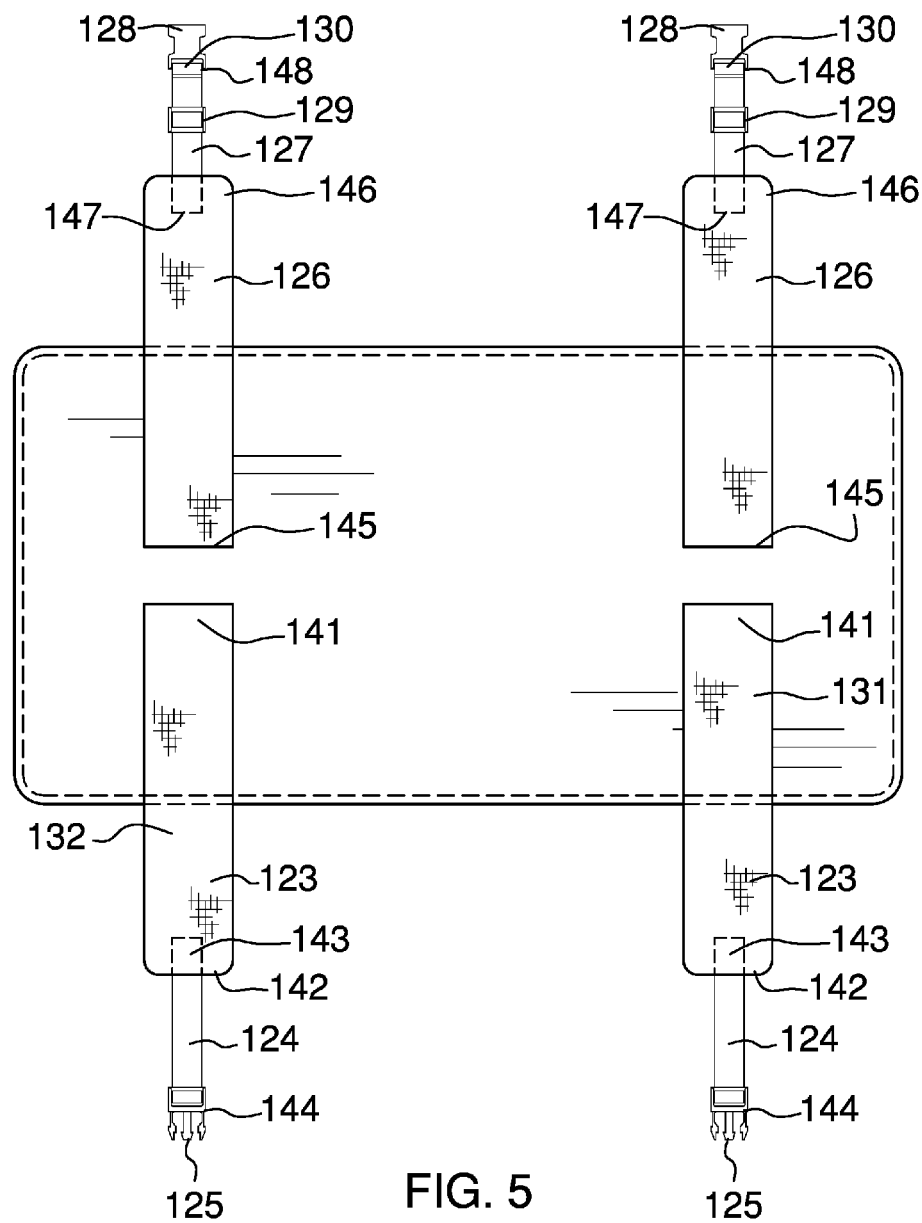
FIG. 5 is a bottom view of an embodiment of the disclosure.

Detailed reference will now be made to a first potential embodiment of the disclosure, which is illustrated in FIGS. 1 through 5.

The cargo bag for an insulated cooler 100 (hereinafter invention) comprises a container 101 and a plurality of straps 102. The invention 100 is adapted for use with a wheeled insulated cooler 151. The invention 100 is attached to the wheeled insulated cooler 151 using the plurality of straps 102 such that the container 101 is attached to the wheeled insulated cooler 151 and can be carried on the wheeled insulated cooler 151 while the wheeled insulated cooler 151 is transported to an event location.

The container 101 comprises a storage box 111, a lid 112, a zipper 113, a hinged connection 114 and a frame 115. The storage box 111 is formed in the shape of a rectangular block with flat sides. The lid 112 is a cover that is used to close the interior portion of the storage box 111. The lid 112 is attached to the storage box 111 using a hinged connection 114. The hinged connection 114 allows the edge of the lid 112 that is distal from the hinged connection 114 to rotate away from the storage box 111 in order to provide access to the interior portion of the storage box 111. The zipper 113 is a commercially available zipper that is used to secure the lid 112 when it is in the closed position. The storage box 111 and the lid 112 are made of a commercially available padded material that is coated in vinyl for easy cleaning. The shape of the storage box 111 is reinforced through the use of the frame 115. The frame 115 is a structure that is designed to provide stiffness to the corners of the storage box 111 while keeping the sides of the storage box 111 soft.

Each of the plurality of straps 102 comprises a quick release buckle 120, a first harness 121, and a second harness 122. The first harness 121 further comprises a first broad webbing 123, a first narrow webbing 124 and a male connector 125. The second harness 122 further comprises a second broad webbing 126, a second narrow webbing 127, a female connector 128, a ring slider 129, and a loop 130. The quick release buckle 120 is further defined with a male connector 125, a female connector 128 and a ring slider 129. The female connector 128 further comprises a loop 130.

The first broad webbing 123 is a webbing that is further defined with a first end 141 and a second end 142. The first narrow webbing 124 is a webbing that is further defined with a third end 143 and a fourth end 144. The span of the width 152 of the first broad webbing 123 is greater than the span of the width 152 of the first narrow webbing 124. The first end 141 of the first broad webbing 123 attaches to the side of the storage box 111 that is distal from the lid 112 using a sewn seam. The third end 143 of the first narrow webbing 124 attaches to the second end 142 of the first broad webbing 123 using a sewn seam. The male connector 125 is installed on the fourth end 144 of the first narrow webbing 124. Methods to install the male connectors 125 of quick release buckles 120 on webbings are well known and documented in the art.

The second broad webbing 126 is a webbing that is further defined with a fifth end 145 and a sixth end 146. The second narrow webbing 127 is a webbing that is further defined with a seventh end 147 and an eighth end 148. The span of the width 152 of the second broad webbing 126 is greater than the span of the width 152 of the second narrow webbing 127. The fifth end 145 of the second broad webbing 126 attaches to the side of the storage box 111 that is distal from the lid 112 using a sewn seam. The seventh end 147 of the second narrow webbing 127 attaches to the sixth end 146 of the second broad webbing 126 using a sewn seam. The female connector 128 and ring slider 129 are installed on the eighth end 148 of the second narrow webbing 127. Methods to install female connectors 128 of quick release buckles 120 on webbings are well known and documented in the art. Methods to install ring sliders 129 and loops 130 configured for the adjustment of webbings are well known and documented in the art.

In the first potential embodiment of the disclosure, the plurality of straps 102 further comprises a first strap 131 and a second strap 132.

To use the invention 100, the container 101 is placed on the lid 112 of the wheeled insulated cooler 151. The first strap 131 is wrapped around the wheeled insulated cooler 151 and secured using the quick release buckle 120. The first strap 131 is tightened to the wheeled insulated cooler 151 using the ring slider 129 and the loop 130 portion of the female connector 128. The second strap 132 is secured to the wheeled insulated cooler 151 in the same manner as the first strap 131.

In the first potential embodiment of the disclosure, a commercially available soft sided framed picnic basket was used as the container 101. Each of the plurality of straps 102 was built as described above. Each of the components described in assembly of each of the plurality of straps 102 is readily and commercially available. In the first potential embodiment of the disclosure, the hinged connection 114 is a flap that is used to connect the lid 112 to the storage box 111.

The following definitions were used in this disclosure:

Buckle: As used in this disclosure, a buckle is a fastening that is used for joining a first loose end of a strap to a second loose end of the same strap or a different strap. A buckle further comprises a male connector that is attached to a first loose end and a female connector that is attached to a second loose end. The male connector has a pin or other structure that is generally caught by a structure formed in the female connector.

Fastener: As used in this disclosure, a fastener is a device that is used to join or affix two objects. Fasteners generally comprise a first part which is attached to the first object and a second part which is attached to the second object.

Flap: As used in this disclosure, a flap is a piece of material that is hinged or otherwise attached to a surface using one side such that the piece of material hangs in such a way as to cover a hole in the surface.

Hinge: As used in this disclosure, a hinge is a device that permits the turning, rotating, or pivoting of a first object relative to a second object.

Pad: As used in this disclosure, a pad is a mass of soft material used as a filling or for protection against damage or injury.

Quick Release Buckle: As used in this disclosure, a quick release buckle is a specific type of buckle wherein the buckle can be readily and easily disconnected by pressing a button or pinching one of the ends of the quick release buckle. Quick release buckles are readily and commercially available.

Sewn Seam: As used in this disclosure, a sewn seam a method of attaching two or more layers of textile, leather, or other material through the use of a thread, a yarn, or a cord that repeatedly inserted and looped through the two or more layers of textile, leather, or other material.

Sheeting: As used in this disclosure, sheeting is a material, such as cloth or plastic, in the form of a thin flexible layer or layers.

Strap: As used in this disclosure a strap is a strip of leather, cloth, or other flexible material, often with a buckle, that is used to fasten, secure, carry, or hold onto something.

Strip: As used in this disclosure, the term describes a long thin object of uniform width. Strips are often rectangular in shape.

Textile: As used in this disclosure, a textile is a material that is woven, knitted, or felted. Synonyms in common usage for this definition include fabric and cloth.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A bag comprising:

a container and a plurality of straps;

wherein the bag is adapted for use with a wheeled insulated cooler;

wherein the bag attaches to the wheeled insulated cooler using the plurality of straps;

wherein the bag attaches to the wheeled insulated cooler such that the container is attached to the wheeled insulated cooler and can be carried on the wheeled insulated cooler while the wheeled insulated cooler is transported;

wherein the container comprises a storage box, a lid, a zipper, a hinged connection and a frame;

wherein the storage box is formed in the shape of a rectangular block with flat sides;

wherein the lid is a cover that is used to close an interior portion of the storage box;

wherein the hinged connection attaches the lid to the storage box using a hinged connection;

wherein the frame is a structure that is designed to provide stiffness to the corners of the storage box while keeping the sides of the storage box soft;

wherein the plurality of straps comprises a quick release buckle, a first harness, and a second harness;

wherein the quick release buckle is further defined with a male connector, a female connector and a ring slider;

wherein the female connector further comprises a loop;

wherein the first harness further comprises a first broad webbing, a first narrow webbing and a male connector.

2. The bag according to claim 1 wherein the second harness further comprises the second broad webbing, a second narrow webbing, the female connector.

3. The bag according to claim 2 wherein the first broad webbing is a webbing that is further defined with a first end and a second end;

wherein the first narrow webbing is a webbing that is further defined with a third end and a fourth end;

wherein the span of the width of the first broad webbing is greater than the span of the width of the first narrow webbing.

4. The bag according to claim 3 wherein the first end of the first broad webbing attaches to the side of the storage box that is distal from the lid.

5. The bag according to claim 4 wherein the third end of the first narrow webbing attaches to the second end of the first broad webbing.

6. The bag according to claim 5 wherein the male connector is installed on the fourth end of the first narrow webbing.

7. The bag according to claim 6 wherein the second broad webbing is a webbing that is further defined with a fifth end and a sixth end;

wherein the second narrow webbing is a webbing that is further defined with a seventh end and an eighth end;

wherein the span of the width of the second broad webbing is greater than the span of the width of the second narrow webbing.

8. The bag according to claim 7 wherein the fifth end of the second broad webbing attaches to the side of the storage box that is distal from the lid.

9. The bag according to claim 8 wherein the seventh end of the second narrow webbing attaches to the sixth end of the second broad webbing.

10. The bag according to claim 9 wherein the female connector and ring slider are installed on the eighth end of the second narrow webbing.

11. The bag according to claim 10 wherein the plurality of straps further comprises a first strap and a second strap.

* * * * *